US012587955B2

(12) United States Patent
Keller et al.

(10) Patent No.: US 12,587,955 B2
(45) Date of Patent: Mar. 24, 2026

(54) NETWORK SLICING SCALABILITY ATTRIBUTES

(71) Applicant: Telefonaktiebolaget LM Ericsson (publ), Stockholm (SE)

(72) Inventors: Ralf Keller, Würselen (DE); David Castellanos Zamora, Madrid (IT); Maria Belen Pancorbo Marcos, Madrid (ES); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 509 days.

(21) Appl. No.: 17/763,972

(22) PCT Filed: Oct. 2, 2020

(86) PCT No.: PCT/IB2020/059283
§ 371 (c)(1),
(2) Date: Mar. 25, 2022

(87) PCT Pub. No.: WO2021/070028
PCT Pub. Date: Apr. 15, 2021

(65) Prior Publication Data
US 2022/0377655 A1    Nov. 24, 2022

(30) Foreign Application Priority Data

Oct. 8, 2019    (EP) ..................................... 19382879

(51) Int. Cl.
H04W 72/04       (2023.01)
H04W 48/04       (2009.01)
(Continued)

(52) U.S. Cl.
CPC ........... *H04W 48/18* (2013.01); *H04W 48/04* (2013.01); *H04W 48/06* (2013.01); *H04W 60/04* (2013.01); *H04W 60/06* (2013.01)

(58) Field of Classification Search
CPC ..... H04W 48/18; H04W 48/04; H04W 48/06; H04W 60/04; H04W 60/06; H04W 60/00;
(Continued)

(56) References Cited

U.S. PATENT DOCUMENTS

| | | | |
|---|---|---|---|
| 6,625,442 B1 * | 9/2003 | Kojima ................... | H04W 4/02 |
| | | | 455/414.1 |
| 7,693,506 B1 * | 4/2010 | Back ..................... | H04W 60/00 |
| | | | 455/432.1 |

(Continued)

FOREIGN PATENT DOCUMENTS

| | | | | |
|---|---|---|---|---|
| CN | 101651975 A | * | 2/2010 | ......... H04W 76/066 |
| WO | 2019182573 A1 | | 9/2019 | |

(Continued)

OTHER PUBLICATIONS

Vivo, "Solution for UE number and PDU session number monitoring", SA WG2 Meeting #136, Nov. 18, 2019, Reno, US, pp. 1-3, S2-1911422, 3GPP.

(Continued)

*Primary Examiner* — Mahbubul Bar Chowdhury
(74) *Attorney, Agent, or Firm* — COATS & BENNETT, PLLC

(57)    ABSTRACT

A mechanism is provided to monitor and control the number of terminals (100) or number of PDU sessions for a network slice, or both. A new network function called the Network Slice Control Function (NSCF) (85) is defined that interacts with an Access and Mobility Management Function (AMF) (40) and/or Session Management Function (SMF) (45) to monitor and control a number of users for a network slice, (Continued)

a number of PDU sessions for a network slice, or both. The NSCF (85) determines per slice quotas for the number of users and/or number of session for network slices and interacts with the AMF (40) and/or SMF (45) to enforce the quotas.

12 Claims, 11 Drawing Sheets

(51) Int. Cl.

| | |
|---|---|
| *H04W 48/06* | (2009.01) |
| *H04W 48/18* | (2009.01) |
| *H04W 60/04* | (2009.01) |
| *H04W 60/06* | (2009.01) |

(58) Field of Classification Search
CPC ... H04W 8/065; H04W 8/14; H04W 28/0247; H04W 28/088; H04W 28/0925; H04W 76/10; H04L 43/0876; H04M 15/66
See application file for complete search history.

(56) References Cited

U.S. PATENT DOCUMENTS

| | | | | |
|---|---|---|---|---|
| 8,150,411 | B2 * | 4/2012 | Fischer ................ | H04W 28/18 |
| | | | | 455/68 |
| 2017/0079059 | A1 * | 3/2017 | Li ......................... | H04W 16/02 |
| 2019/0159015 | A1 | 5/2019 | Qiao et al. | |
| 2019/0174536 | A1 * | 6/2019 | Han ................... | H04W 74/0833 |
| 2021/0099945 | A1 * | 4/2021 | Watfa ................... | H04W 48/18 |
| 2022/0159605 | A1 * | 5/2022 | Li ......................... | H04W 60/00 |
| 2022/0248314 | A1 * | 8/2022 | Won ..................... | H04W 48/02 |
| 2022/0256439 | A1 * | 8/2022 | Casati .................. | H04W 60/00 |
| 2022/0345996 | A1 * | 10/2022 | Jeong ................ | H04W 28/0268 |
| 2022/0369207 | A1 * | 11/2022 | Ianev ................... | H04W 76/18 |
| 2022/0394596 | A1 * | 12/2022 | Casati .................. | H04W 48/06 |

FOREIGN PATENT DOCUMENTS

| | | | | |
|---|---|---|---|---|
| WO | | 2020186145 | A1 | 9/2020 |
| WO | | 2021006090 | A1 | 1/2021 |
| WO | WO-2021063764 | A1 * | 4/2021 | ............ H04W 16/02 |

OTHER PUBLICATIONS

CATT, "Ki #1, 285, New Sol: Support of network slice quota control and enforcement", 3GPP TSG-SA WG2 Meeting #139E, Elbonia, Jun. 1, 2020, pp. 1-6, S2-2004075, 3GPP.

3rd Generation Partnership Project, "3rd Generation Partnership Project; Technical Specification Group Services and System Aspects; Management and orchestration; 5G performance measurements (Release 16)", Technical Specification, 3GPP TS 28.552 V16.3.0, Sep. 1, 2019, pp. 1-119, 3GPP, France.

3rd Generation Partnership Project, "3rd Generation Partnership Project; Technical Specification Group Services and System Aspects; Management and orchestration; 5G Network Resource Model (NRM); Stage 2 and stage 3 (Release 16)", Technical Specification, 3GPP TS 28.541 V16.2.0, Sep. 1, 2019, pp. 1-313, 3GPP, France.

3rd Generation Partnership Project, "3rd Generation Partnership Project; Technical Specification Group Services and System Aspects; Procedures for the 5G System (5GS); Stage 2 (Release 15)", Technical Specification, 3GPP TS 23.502 V15.7.0, Sep. 1, 2019, pp. 1-346, 3GPP, France.

3rd Generation Partnership Project, "3rd Generation Partnership Project; Technical Specification Group Services and System Aspects; System Architecture for the 5G System (5GS); Stage 2 (Release 16)", Technical Specification, 3GPP TS 23.501 V16.2.0, Sep. 1, 2019, pp. 1-377, 3GPP, France.

Nokia et al., "New WID Study on Enhancement of Network Slicing Phase 2", 3GPP TSG|WG-SA WG2 Meeting #134, Sapporo, Japan, Jun. 24, 2019, pp. 1-3, S2-1908583, 3GPP.

NTT Docomo, "New Key Issue on support for network slice quota enforcement in a network slice", SA, WG2 Meeting #135, Split, HR, Oct. 14, 2019, pp. 1-2, S2-1909218, 3GPP.

3rd Generation Partnership Project, "3rd Generation Partnership Project; Technical Specification Group Services and System Aspects; Study on enhancement of network slicing; Phase 2 (Release 17)", Technical Report, 3GPP TR 23.700-40 V1.0.0, Sep. 1, 2020, pp. 1-191, 3GPP, France.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V15.1.0, Mar. 1, 2018, pp. 1-282, 3GPP, France.

The GSM Association, "Generic Network Slice Template", Version 1.0, May 23, 2019, pp. 1-60, obtained from Internet: https://www.gsma.com/newsroom/wp-content/uploads//NG.116-v1.0-4.pdf.

ETSI, "5G; Procedures for the 5G System (5GS) (3GPP TS 23.50-2 version 15.7.0 Release 15)", ETSI TS 123 502 V15.7.0 (Oct. 2019), Technical Specification, pp. 1-362.

3rd Generation Partnership Project, 3rd Generation Partnership Project; Technical Specification Group Services and System Aspects; Study on enhancement of network slicing; Phase 2 (Release 17), 3GPP TR 23.700-40 V0.5.0 (Sep. 2020); pp. 1-191.

* cited by examiner

250

260

DETERMINE NETWORK SLICE CONTROL
INFORMATION FOR A NETWORK SLICE

270

SEND THE NETWORK SLICE CONTROL
INFORMATION TO A NETWORK NODE RESPONSIBLE
FOR CONTROLLING USE OF THE NETWORK SLICE

NETWORK NODE 400 (E.G., NSCF u OR NSSF u)

DETERMINING UNIT 410

SENDING UNIT 420

NETWORK NODE 300 (E.G., AMF 40 OR SMF 45)

FIRST RECEIVING UNIT 310

2ND RECEIVING UNIT 320

CONTROL UNIT 330

INTERFACE CIR. 520

PROCESSING CIR. 530

MEMORY 540

PROGRAM
550

NETWORK SLICING SCALABILITY ATTRIBUTES

TECHNICAL FIELD

The present disclosure relates generally to network slicing in wireless communication networks and, more particularly to control of network slice usage.

BACKGROUND

The 5G networks are designed to support network slicing. Network slicing allows the use of virtualized networks to separate networks designed for specific purposes. Each network slice provides customized connectivity and features specifically tailored for a specific purpose, and executes on a shared, distributed infrastructure that provides high availability and flexibility.

The GSM Association (GSMA) document GSMA NG.116 describes a Generic Slice Template (GST) comprising a set of attributes that can be used by an operator to define a network slice type (NEST). These parameters include the maximum number of connections (e.g., concurrent Packet Data Unit (PDU) sessions) supported by the network slice and the maximum number of terminals (e.g., user equipment (UEs)) supported by the network slice. These attributes provide useful input to scale the network slice and provision enough physical resources to the network slice. There is a significant difference between a network slice designed to serve 10 users and a network slice designed to serve 1,000,000 users. Typically, either the maximum number of connections or the maximum number of terminals is defined by the NEST. The NEST can, in some cases define both the maximum number of connections and the maximum number of terminals supported by the network slice. Currently, there is no mechanism in the standards to monitor the number of terminals or number of connections for a network slice.

SUMMARY

The present disclosure provides a mechanism, which does not exist in the current standards, to monitor and control the number of terminals or number of PDU sessions (also referred to as a number of connections) for a network slice, or both. A new network functionality called the Network Slice Control Function (NSCF) is defined that interacts with an Access and Mobility Management function (AMF) and/or Session Management Function (SMF) to monitor and control a number of users for a network slice, a number of Packet Data Unit (PDU) sessions for a network slice, or both. The NSCF determines per network slice quotas for the number of users and/or number of PDU sessions for network slices and interacts with the AMF and/or SMF to enforce the quotas. The new functionality may comprise a new standalone function or may comprise an extension of an existing network function.

A first aspect of the disclosure comprises methods implemented by a AMF, SMF or other network node of controlling usage of a network slice. The network node receives a request to use a network slice associated with a network slice identifier. In some embodiments, the network node may comprise an AMF and the request may comprise a request to register a user on the network slice. In some embodiments, the network node may comprise a SMF and the request may comprise a request to establish a session for a user on the network. The network node further receives network slice control information associated with the network slice identifier from a network slice control node. The network node controls use of the network slice based on network slice control information.

A second aspect of the disclosure comprises methods implemented by a NSCF of controlling usage of a network slice. The NSCF determines network slice control information for a network slice. The NSCF sends the network slice control information to another network node (e.g., AMF or SMF) responsible for controlling use of the network slice.

A third aspect of the disclosure comprises a network node such as an AMF or SMF configured to control use of a network slice. The network node comprises interface circuitry for communicating over a communication network with other network nodes and processing circuitry. The processing circuitry is configured to receive a request to use a network slice associated with a network slice identifier. The processing circuitry is further configured to receive network slice control information associated with the network slice identifier from a network slice control node. The processing circuitry is further configured to control use of the network slice based on network slice control information.

A fourth aspect of the disclosure comprises a network node such as an AMF or SMF configured to control use of a network slice. The network node comprises an interface circuitry for communicating over a communication network with other network nodes and processing circuitry. The processing circuitry is configured to determine network slice control information for a network slice. The processing circuitry is further configured to send the network slice control information to another network node (e.g., AMF or SMF) responsible for controlling use of the network slice.

A fifth aspect of the disclosure comprises computer programs containing instructions that, when executed by a processing circuitry in a network node causes the network node to perform the methods according to the first or second aspects. The computer programs may be embodied in a carrier such as an electronic signal, optical signal, radio signal, or non-transitory computer readable storage medium.

DETAILED DESCRIPTION

Figure 1:
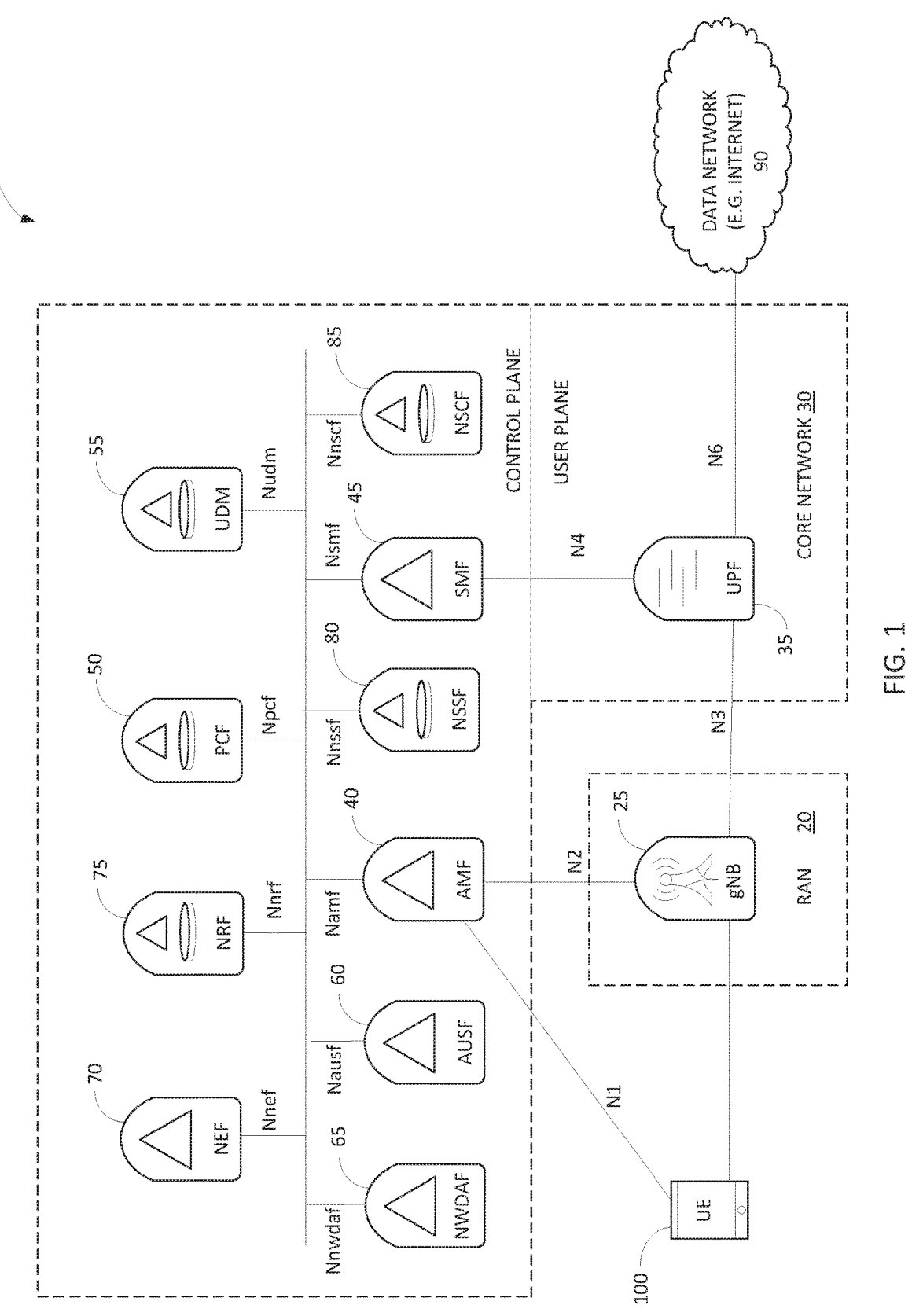
FIG. 1 illustrates an exemplary wireless network architecture for implementing network slicing.

Referring now to the drawings, an exemplary embodiment of the disclosure will be described in the context of a 5G wireless communication network. Those skilled in the art will appreciate that the methods and apparatus herein described are not limited to use in 5G networks but may also be used in wireless communication networks operating according to other standards.

FIG. 1 illustrates a wireless communication network 10 according to one exemplary embodiment. The wireless communication network 10 comprises a radio access network (RAN) 20 and a 5G core network (5GC) 30 employing a service-based architecture. The RAN 20 comprises one or more base stations 25 providing radio access to UEs 100 operating within the wireless communication network 10. The base stations 25 are also referred to as gNodeBs (gNBs). The core network 30 provides a connection between the RAN 20 and other packet data networks 90, such as the IMS or the Internet.

In one exemplary embodiment, the core network 30 comprises a plurality of network functions (NFs), such as a User Plane Function (UPF) 35, an Access And Mobility Management Function (AMF) 40, a Session Management Function (SMF) 45, a Policy Control Function (PCF) 50, a Unified Data Management (UDM) function 55, a Authentication Server Function (AUSF) 60, a Network Exposure Function (NEF) 70, a Network Repository Function (NRF) 75 and a Network Slice Selection Function (NSSF) 80. The core network 30 may additionally include a Network Data Analytics Function (NWDAF) 65 for generating and distributing analytics reports. These NFs comprise logical entities that reside in one or more core network nodes, which may be implemented by one or more processors, hardware, firmware, or a combination thereof. The functions may reside in a single core network node or may be distributed among two or more core network nodes.

In conventional wireless communication network, the various NFs (e.g., SMF 45, AMF 40, etc.) in the core network 30 communicate with one another over predefined interfaces. In the service-based architecture shown in FIG. 1, instead of predefined interfaces between the control plane functions, the wireless communication network 10 uses a services model in which the NFs query the NRF 75 or other NF discovery node to discover and communicate with each other.

The 5GC 30 is designed to support network slicing. Network slicing allows the use virtualized networks to separate networks designed for different purposes. Each network slice provides customized features and connectivity specifically tailored for a specific purpose, and executes on a shared, distributed infrastructure that provides high availability and flexibility.

GSMA NG.116 describes a set of attributes that can be used by an operator to define a network slice type (NEST). These parameters include the maximum number of connections (e.g., concurrent PDU sessions) supported by the network slice and the maximum number of users (e.g., user equipment (UEs)) supported by the network slice. These attributes provide useful input to scale the network slice and provision enough physical resources to the network slice.

There is a significant difference between a network slice designed to serve 10 users and a network slice designed to serve 1,000,000 users. Typically, either the maximum number of connections or the maximum number of terminals is defined by the NEST. The NEST can, in some cases define both the maximum number of connections and the maximum number of terminals supported by the network slice.

One aspect of the present disclosure comprises mechanisms for monitoring and/or controlling the maximum number of users, the maximum number of PDU sessions, or both, supported by a network slice in a real network. In one embodiment, a new network function called the Network Slice Control Function (NSCF) 85 is defined that interacts with the AMF 40 and/or SMF 45 to monitor and control a number of users for a network slice, a number of PDU sessions for a network slice, or both. Those skilled in the art will appreciate that the NSCF 85 may also control other attributes of a network slice, such as uplink (UL) data rate and downlink (DL) data rate. In some embodiments, the NSCF 85 is implemented as a stand-alone function that interacts with the AMF 40 and SMF 45 to monitor and control a number of users for a network slice, a number of PDU sessions for a network slice, or both. In other embodiments, separate NSCFs 85 can be provided; one to monitor and/or control a maximum number of users and one to monitor and/or control a maximum number of PDU sessions. In other embodiments, the NSCF 85 is implemented as an extension of an existing function, such as an NSSF 80.

To enable the monitoring and control, the AMF 40 and/or SMF 45 need to be informed about the network slices for which monitoring is needed. In embodiments of the present disclosure, the AMF 40 and/or SMF 45 are provided Network Slice Selection Assistance Information (NSSAI). The NSSAI is a collection of Single NSSAIs (S-NSSAIs) and, in embodiments of the present disclosure, is used to identify network slices for which monitoring is needed. The 3GPP standard currently allows up to eight (8) S-NSSAIs in the NSSAI sent in signaling messages between a UE 100 and the network 10. Thus, a single UE 100 may use at most eight network slices at a time. During normal operations, the UE 100 sends the S-NSSAI to the network 10 in a request or other signaling message to assist the network in selecting a particular network slice instance (NSI). An S-NSSAI comprises a Slice/Service type (SST), which refers to the expected features and services offered by the network slice. For example, currently defined service types include Enhanced Mobile Broadband (eMBB), Ultra Reliable Low Latency Communications (URLLC), Massive Internet of Things (MIoT), vehicle-to-vehicle (V2V) communications and vehicle-to-everything (V2X) communications. The S-NSSAI may also optionally include a Slice Differentiator (SD), that further differentiates network slices of the same SST.

The S-NSSAI may be associated with a Public Land Mobile Network (PLMN) that is identified by a PLMN Identifer (PLMN ID). Generally, a UE 100 may provide the AMF 40 or SMF 45 with a S-NSSAI when the UE 100 is connected to an access network in the PLMN associated with the S-NSSAI. The S-NSSAI can have network-specific values, standard values, or some combination thereof. In embodiments of the present disclosure, the S-NSSAI may include an indication or information indicating whether network slice monitoring for the S-NSSAI is enabled. In other embodiments, the indication to enable network slice monitoring can be provided separately. In some embodiments, the UDM 55 may indicate to the AMF 40 and/or SMF 45 whether monitoring is enabled for a S-NSSAI regarding the number of users, the number of PDU sessions, or both. In other embodiments, the NSSF 80 maintains a list of S-NSSAIs that are to be monitored regarding a number of users, a number of PDU sessions, or both, and provides the list to the AMF 40 and/or SMF 45. In still other embodiments, the list of S-NSSAIs that are to be monitored can provided via a local configuration, or via interaction with the NRF 75.

Figure 2:
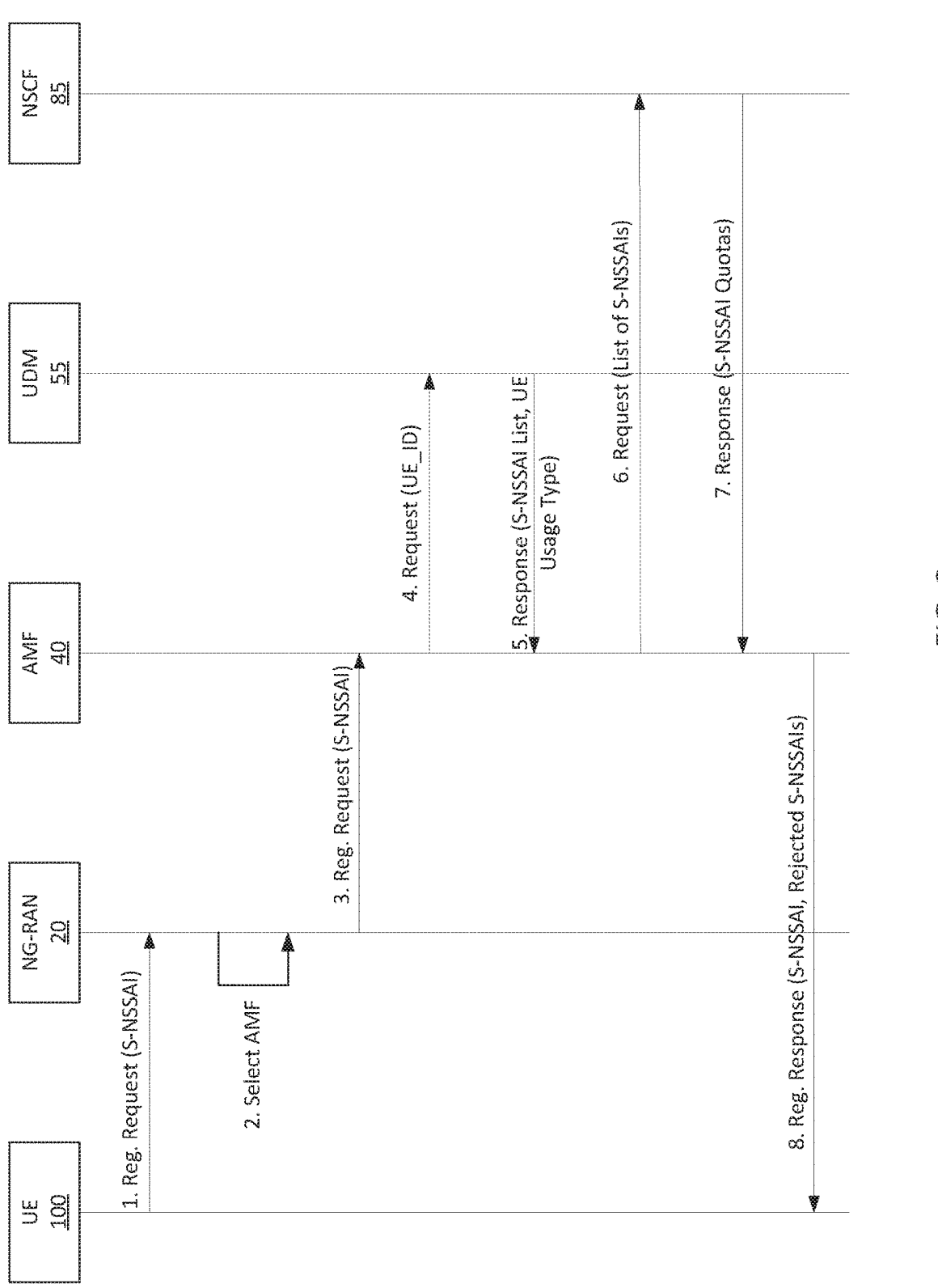
FIG. 2 illustrates an exemplary procedure for controlling network slice usage in the context of user registration.

FIG. 2 illustrates S-NSSAI monitoring in the context of a registration procedure based on a quota indicating a maximum number of users for the network slice. In this example, it is assumed that the S-NSSAI is to be monitored regarding the number of users and that the AMF 40 is not aware of the quota. The UE 100 sends a registration request to the NG RAN 20 (S1). The UE 100 may provide a requested S-NSSAI in the registration request. If the registration request does not include the requested S-NSSAI, the AMF 40 may select a S-NSSAI. The requested S-NSSAI may be based on 1) allowed NSSAI, 2) a preconfigured default NSSAI, or 3) the S-NSSAIs for one or more established PDU sessions. The NG RAN 20 selects an AMF 40 taking into account the requested S-NSSAI if any (S2) and forwards the registration request to the target AMF 40 (S3). Upon receipt of the registration request from the UE 100, the AMF 40 sends an information request to the UDM 55 to obtain subscription information for the user (S4). The subscription information may include the subscribed S-NSSAIs for the user and, optionally, the UE Usage type. Responsive to the information request, the UDM 55 returns the subscribed S-NSSAIs to the AMF 40 in a response message (S5). After determining the subscribed S-NSSAIs that are allowed, the AMF 40 interacts with the NSCF 85 to retrieve a quota for S-NSSAIs (S6, S7). The quota may be a discrete quota for each S-NSSAI or a per-slice quota applicable to all S-NSSAIs. The NSCF 85 divides the total UE quota for the network slice into quotas for each AMF 40 in the network slice. The smaller the quota, the greater the number of interactions with the NSCF 85.

The AMF 40 determines whether to accept, redirect or reject the request based on the quotas for the allowed S-NSSAIs and sends a registration response to the UE 100 (S8). Generally, the AMF 40 accepts registration requests for a S-NSSAI until the quota for the corresponding network slice is reached. In some embodiments, the AMF 40 rejects the registration request if the quota for the requested S-NSSAI has been reached (i.e., if acceptance of the request would exceed the maximum number of UEs 100). In some embodiments, the AMF 40 may accept a registration request and provide an alternate S-NSSAI when the quota for the requested S-NSSAI has been reached and additional capacity is available on an alternate S-NSSAI. In embodiments where reselection of the S-NSSAI is permitted, the registration request can be accepted until the quotas for all allowed S-NSSAIs have been reached.

When a registration request has been rejected because the quota for a requested S-NSSAI has been reached, or the quota for all allowed S-NSSAIs had been reached, the AMF 40 may provide an indication in the registration response that the rejection is due to the quota and not to other causes and indicate a back-off period during which the UE 100 is prohibited from requesting the same S-NSSAI. During the back-off period, the UE 100 may attempt registration on another S-NSSAI. When the back-off timer expires, the UE 100 may again use the S-NSSAI that triggered the rejection.

In some embodiments of the disclosure, the UE quotas provided to the AMF 40 may be specified in relation to an area covered by the network slice. The area may be specified in the form of a geographical area representation, a tracking area (TA), a cell identifier (Cell ID), or an access node identifier (AN ID). The S-NSSAI may be extended to include an optional associated area. When no area is specified, the UE quota is applied to the entire coverage area of the network slice. Specifying the quota in relation to an area allows quotas to be applied to only a part of the network slice. Separate UE quotas can be defined for multiple areas covered by the same network slice. When a location-specific quota is used, the AMF 40 needs to determine the location of the UE 100 sending the request and apply the quota for the area in which the UE 100 is located. The AMF 40 may need to create or define registration areas, each of which is confined to or coincident to one of the defined areas.

In some embodiments of the disclosure, the treatment of the registration request may be differentiated based on a priority of the user. For example, the users may be divided into two classes referred to herein as priority users and non-priority users. In one embodiment, the quota is applied only to non-priority users. The AMF 40 may accept registration requests from both priority users and non-priority users until the quota is reached. Once the quota is reached, requests from only priority users can be accepted. In other embodiments, separate quotas may be provided for different classes, i.e., levels of priority, of users.

Figure 3:
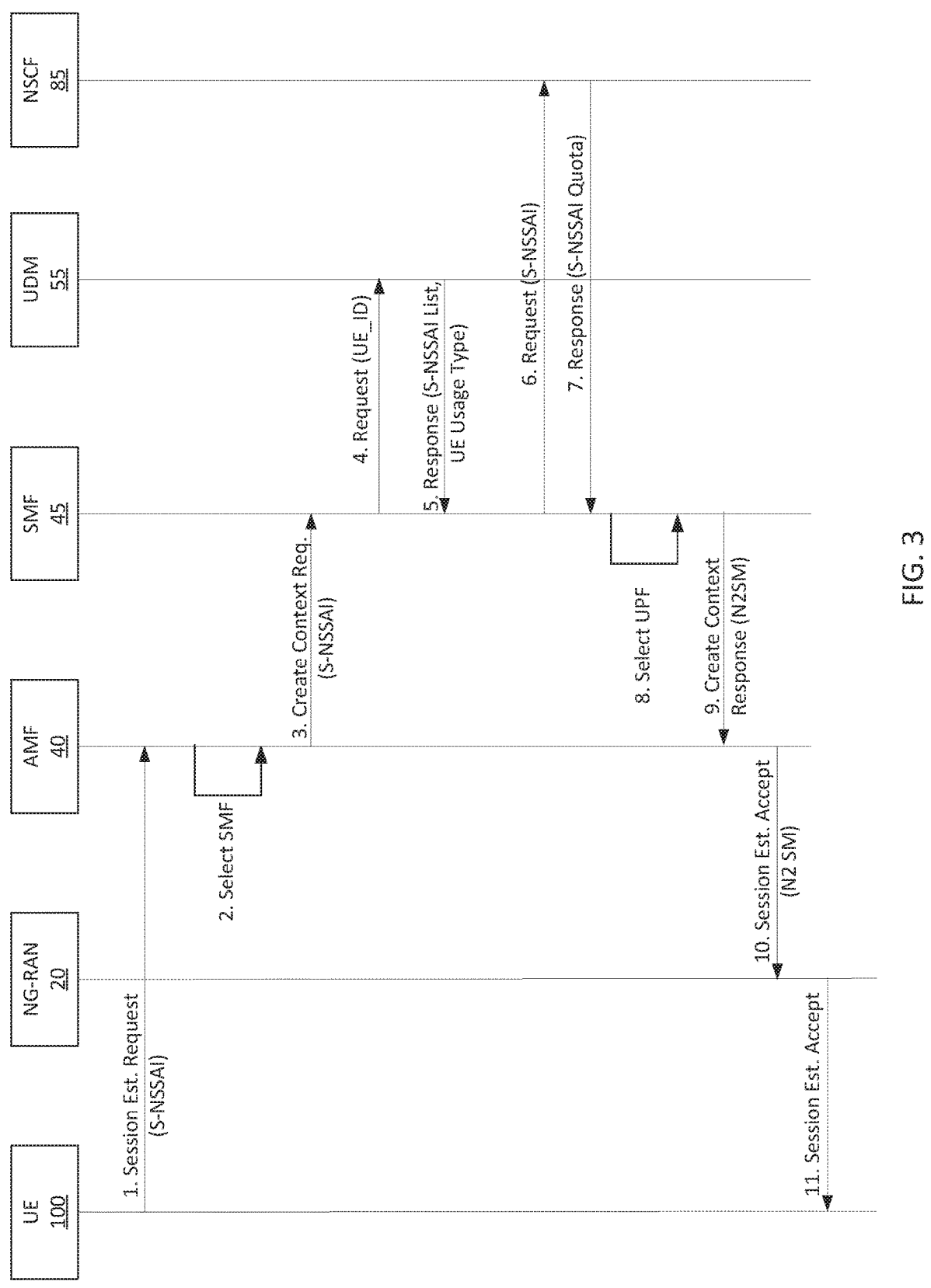
FIG. 3 illustrates an exemplary procedure for controlling network slice usage in the context of PDU session establishment.

FIG. 3 illustrates S-NSSAI monitoring in the context of a session establishment procedure based on a quota indicating a maximum number of PDU sessions for the network slice. In this example, it is assumed that the S-NSSAI is to be monitored regarding the number of PDU sessions and that the SMF 45 is not aware of the quota. It is further assumed that the UE 100 is already registered on the network slice. The UE 100 sends a session establishment request to the AMF 40 (S1). The session establishment request includes a Data Network Name (DNN) and a requested S-NSSAI. If the session establishment request does not include the requested S-NSSAI, the AMF 40 may select a S-NSSAI. The AMF 40 selects and SMF 45 based on the DNN and S-NSSAI (S2) and sends a Create Context request including the DNN and S-NSSAI to the SMF 45 (S3). In some embodiments, the SMF 45 may request session management (SM) subscription data from the UDM 55 using the DNN and S-NSSAI (S4). In response to the request, the UDM 55 provides the SM subscription data including a list of allowed S-NSSAIs (S5). The SMF 45 verifies that the requested S-NSSAI matches one of the allowed S-NSSAIs. After verifying that the requested S-NSSAI is allowed, the SMF 45 sends a request to the NSCF 85 for network slice control information (S6). In response to the request, the NSCF 85 sends the SMF 45 a response message including a session quota for the requested S-NSSAI indicated a maximum number of PDU sessions for the network slice (S7). The quota may be a discrete quota for each S-NSSAI or a per-slice quota applicable to all S-NSSAIs. The NSCF 85 divides the total PDU session quota for the network slice into quotas for each SMF 45 in the network slice. The smaller the quota, the greater the number of interactions with the NSCF 85. In some embodiments, the signaling in S4-S7 in FIG. 3 may be performed by the AMF 40 prior to sending the Create Context Request.

Generally, the SMF 45 allows establishment of the session as long as there is sufficient quota to support the additional PDU session. If the quota for the requested session is not sufficient to support the new session, the SMF 45 can reject the request. In some embodiments, the SMF 45 may accept the session establishment request if the quota for the requested network slice has been reached and an alternate network slice has sufficient quota to handle the new session. In another embodiment, the SMF 45 may terminate another session for the same or different user on the requested network slice and establish the new session in situations where the quota has been reached. The session termination may be based on the priority of the users and/or session types.

When the SMF 45 accepts the session establishment request, the SMF 45 selects a UPF 35 (S8) and sends a create context response to the AMF 40 (S9). The create context response includes N2 session management information for the NG RAN 20. For each PDU session for the UE, the AMF 40 stores the PDU session ID, S-NSSAI, and SMF address. In some embodiments, the AMF 40 may also store a Packet Data Network Gateway (PGW) address, and EPS bearer ID. The AMF 40 sends a session establishment accept message to the NG RAN 20 which includes the N2 session management information (S10). The NG RAN 20 forwards the session establishment accept message to the UE 100 (S11).

When a session establishment request has been rejected because the quota for a requested S-NSSAI has been reached, or the quota for all allowed S-NSSAIs had been reached, the AMF 40 may provide an indication in the session establishment accept message that the rejection is due to the quota and not to other causes and indicate a back-off period during which the UE 100 is prohibited from requesting the same S-NSSAI. During the back-off period, the UE 100 may attempt to establish a session on another S-NSSAI. When the back-off timer expires, the UE 100 may again use the S-NSSAI that triggered the rejection.

In some embodiments of the disclosure, the PDU session quotas may be specified in relation to an area covered by the network slice. The area may be specified in the form of a geographical area representation, a tracking area (TA), a cell identifier (Cell ID, or an access node identifier (AN ID). As noted above, the S-NSSAI may be extended to include an optional associated area. When no area is specified, the PDU session quota is applied to the entire coverage area of the network slice. Specifying the PDU session quota in relation to an area allows PDU session quotas to be applied to only a part of the network slice. Separate PDU session quotas can be defined for multiple areas covered by the same network slice. When a location-specific PDU session quota is used, the SMF 45 needs to determine the location of the UE sending the request and apply the quota for the area in which the UE 100 is located.

In some embodiments of the disclosure, the PDU session quota is given in relation to a PDU session type. When a session type is not specified, either explicitly or implicitly, the quota is applied to all session types. Different PDU session types may be given different priority to differentiate treatment of requests depending on the PDU session type. For example, the SMF 45 may apply the quota to all PDU session establishment requests until the quota for the network slice is reached. Once the quota is reached, the SMF 45 may accept requests only for a specified PDU session type (e.g. ARP) and reject all other requests. In other embodiments, individual PDU session quotas may be provided for different PDU session types.

In the embodiments thus far described, enforcement of the quotas is performed by the AMF 40 and/or SMF 45. In other embodiments, the enforcement of the quotas may be performed by the NSCF 85.

Figure 4:
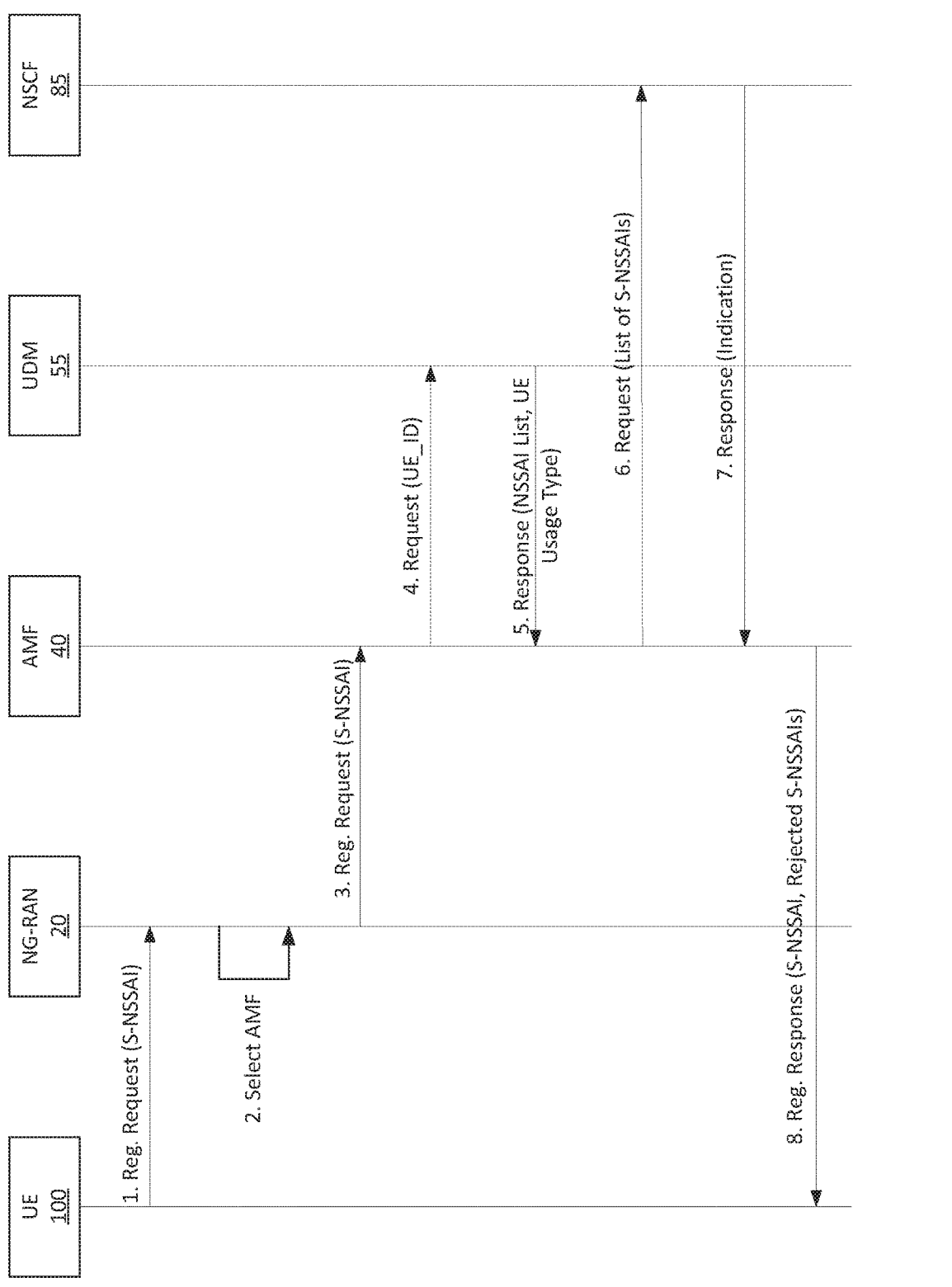
FIG. 4 illustrates an exemplary procedure for controlling network slice usage in the context of user registration.

FIG. 4 illustrates S-NSSAI monitoring in the context of a registration procedure where enforcement of UE quotas is performed by the NSCF 85. The signaling represented by S1-S6 in FIG. 4 is the same as the embodiment shown in FIG. 2. The request sent at S6 from the AMF 40 to the NSCF 85 includes a list of allowed S-NSSAIs for the user. This list may or may not include the requested S-NSSAI. In response to the request, the NSCF 85 determines which, if any, of the allowed S-NSSAIs have sufficient quota to support the request and provides an indication to the AMF 40 indicating which of the allowed S-NSSAIs are available, i.e., have sufficient quota to support the request (S7). The AMF 40 may accept or reject the registration request depending on the indication provided by the NSCF 85. The indication constitutes network slice control information. The AMF 40 may report to the NSCF 85 when a user is registered or deregistered. The NSCF 85 may keep count of the number of users for each network slice being monitored.

In some embodiments, the indication of availability provided by the NSCF 85 may be in the form of a list of the available S-NSSAIs. Any S-NSSAI not included in the list is considered unavailable. In another embodiment, the indication comprises a list of the allowed S-NSSAIs with a corresponding flag (e.g. "0" or "1") indicating whether the S-NSSAI is available. In still other embodiments, the indication comprises a bitmap, wherein each bit in the bitmap corresponds to one of the S-NSSAIs and the value of the bit indicates whether the S-NSSAI is available.

The AMF 40 sends a Registration Response to the UE (S8). The Registration Response includes an S-NSSAI, which may be different from the requested S-NSSAI. The Registration Response may further include a list of rejected S-NSSAIs.

Figure 5:
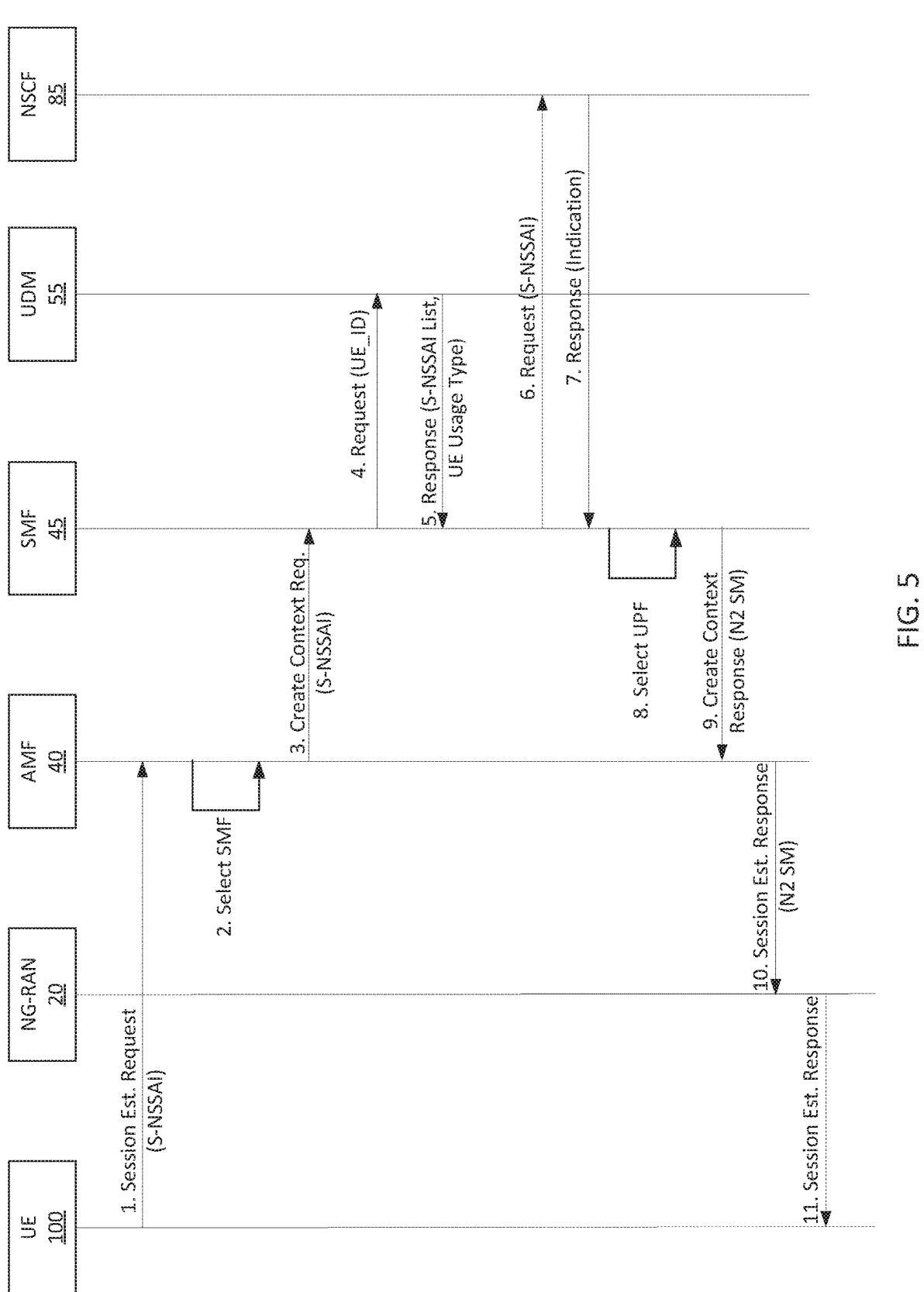
FIG. 5 illustrates an exemplary procedure for controlling network slice usage in the context of PDU session establishment.

FIG. 5 illustrates S-NSSAI monitoring in the context of a session establish procedure where enforcement of PDU session quotas is provided by the NSCF 85. The signaling represented by S1-S6 in FIG. 5 is the same as the embodiment shown in FIG. 3. At S6, the SMF 45 sends a request to the NSCF including the requested S-NSSAI. In response to the request, the NSCF 85 determines whether the PDU session quota for the requested S-NSSAI has been reached and provides an indication of the result in its response (S7). If a new session on the requested S-NSSAI is not possible, the SMF 45 may send one or more additional requests with alternate S-NSSAIs. In other embodiments, the SMF 45 may provide the NSCF 85 with a list of allowed S-NSSAIs and the NSCF 85 may provide in response an indication which of the allowed S-NSSAIs are available. As noted above, the indication may comprise a list of the available S-NSSAIs, an explicit flag corresponding to each S-NSSAI indicating its availability, or a bitmap indicating the availability of each S-NSSAI. The SMF 45 may report to the NSCF 85 when a session is established or terminated. The NSCF 85 may keep count of the number of sessions for each network slice being monitored.

When the SMF 45 accepts the session establishment request, the SMF 45 selects a UPF 35 (S8) and sends a create context response to the AMF 40 (S9). The create context response includes N2 session management information for the NG RAN 20. For each PDU session for the UE, the AMF 40 stores the PDU session ID, S-NSSAI, and SMF address. In some embodiments, the AMF 40 may also store a Packet Data Network Gateway (PGW) address, and EPS bearer ID. The AMF 40 sends a session establishment accept message to the NG RAN 20 which includes the N2 session management information (S10). The NG RAN 20 forwards the session establishment accept message to the UE 100 (S11).

In some embodiments of the disclosure, the enforcement function can be divided between the AMF 40 or SMF 45 and the NSCF 85. The NSCF 85 may provide quotas to the AMF 40 and/or SMF 45 for network slices as previously described. The AMF 40 may accept new users and the SMF 45 may accept new PDU sessions until the quota is reached. Instead of rejecting requests once the quota is reached, the AMF 40 or SMF 45 can be configured to either (1) request additional quota for the S-NSSAI from the NSCF 85, or (2) notify the NSCF 85 that the quota is reached and wait for instruction from the NSCF 85. In the first case, enforcement of the quota continues to be performed by the AMF 40 or SMF 45 based on the additional quota provided by the NSCF 85. In the second case, enforcement of the quota is performed by the AMF 40 or SMF 45 until a threshold number of users or sessions is reached, after which the NSCF 85 determines whether to accept or reject the request on a case—by case basis.

In some embodiments of the disclosure, a stand-alone NSCF 85 not co-located with NSSF 80 may subscribe to receive event notifications or load reports from other network nodes regarding a number of current users for a network slice or number of current sessions for a network slice. Alternatively, where the NSCF 85 is co-located with the NSSF 80, the NSSF 80—may subscribe to receive the event notifications. The NSCF 85 or NSSF 80 determines the S-NSSAIs or NSI Identifiers (NSI IDs) that need to be monitored.

Figure 6:
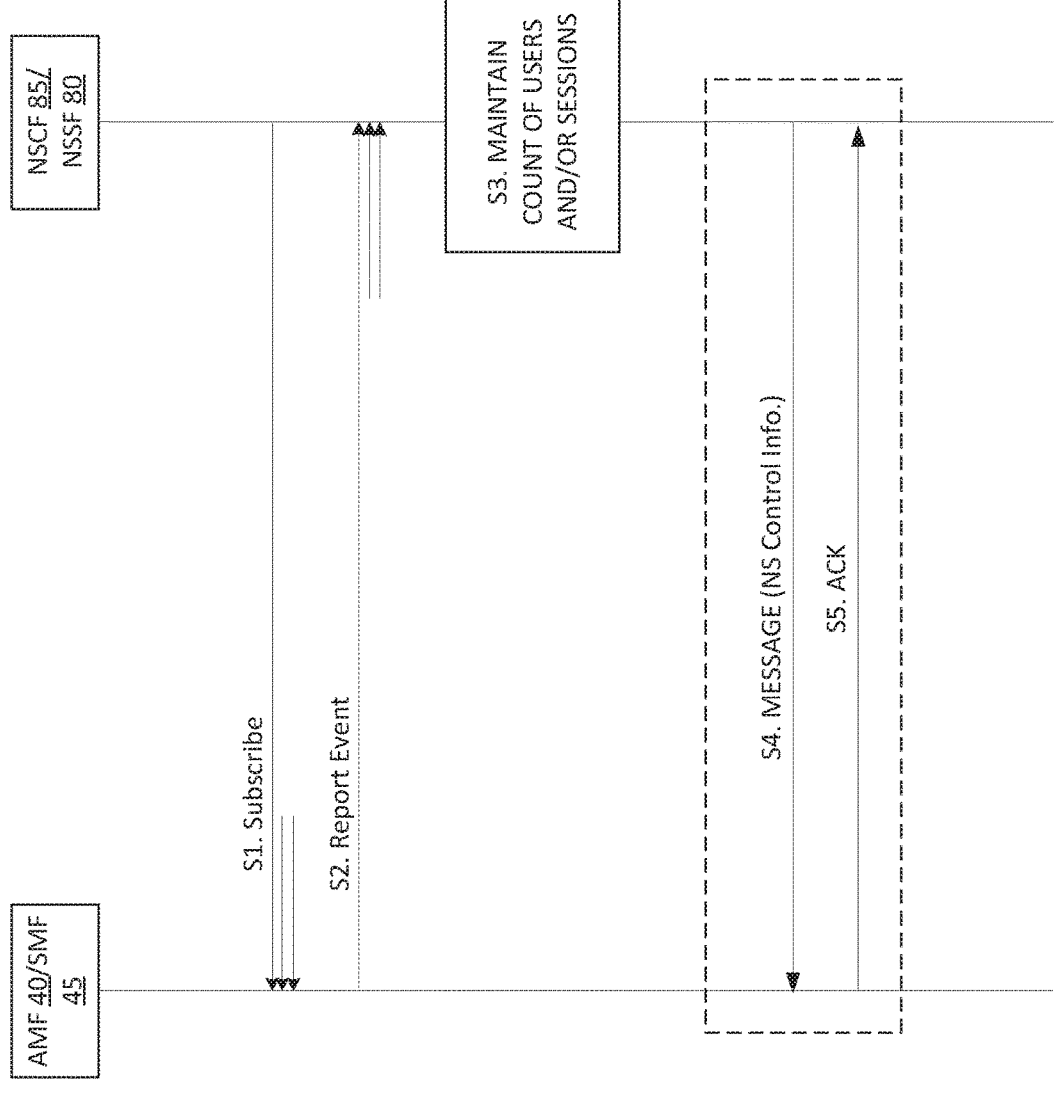
FIG. 6 illustrates an exemplary procedure for controlling network slice usage

In one embodiment, shown in FIG. 6, a NSCF 85 that is not collocated with the NSSF 80 subscribes directly with the AMF 40 and/or SMF 45 supporting each S-NSSAI to receive event notifications responsive to registration events or session establish events. The NSCF 85 sends a subscription request to each AMF 40 and/or SMF 45 supporting the network slice (S1). In response to the subscription request, the AMFs 40 and/or SMFs 45 within the network slice send event notifications to the NSCF 85 responsive to a registration event (in the case of an AMF 40) or a session establishment event (in the case of a SMF 45) (S2). The NSCF 85 may keep count of the number of users and/or number of PDU sessions for each network slice being monitored (S3). When a threshold or quota is reached, the NSCF 85 may send network slice control information to the AMF 40 and/or SMF 45 accordingly (S4). The network slice control information may, for example, comprise quotas on the maximum number of users or maximum number of PDU sessions for the network slice as previously described. In other embodiments, the network slice control information may comprise an indication to start accepting new users, stop accepting new users, start accepting new PDU sessions, or stop accepting new PDU sessions. In response to the message from the NSCF 85, the AMF 40 or SMF 45 sends an acknowledgment back to the NSCF 85 and applies the network slice control information (S5).

In some embodiments, the event notifications are sent by the AMF 40 each time a user is registered or deregistered. Similarly, the SMF 45 sends an event notification each time a session for a UE 100 is established or terminated. In this case, the NSCF 85 can aggregate the event notifications from all the AMFs 40 and/or SMFs 45 and maintain a current count of the number of users and/or number of PDU sessions on a network slice at any given time. To minimize the event reporting, the AMF 40 and/or SMF 45 may be requested to provide an event report periodically or when certain thresholds are passed. In this embodiment, the event report, also referred to herein as a load report, may provide the total number of current users and/or sessions at the time of the event report. In another embodiment, the event reports may provide a net number of users that registered/deregistered since the last event or a net number of PDU sessions created/terminated since the last event report. In this case, the NSCF 85 can aggregate the information in the event reports from all the AMFs 40 and/or SMFs 45 and maintain a current count of the number of users and/or number of PDU sessions on a network slice at any given time.

Figure 7:
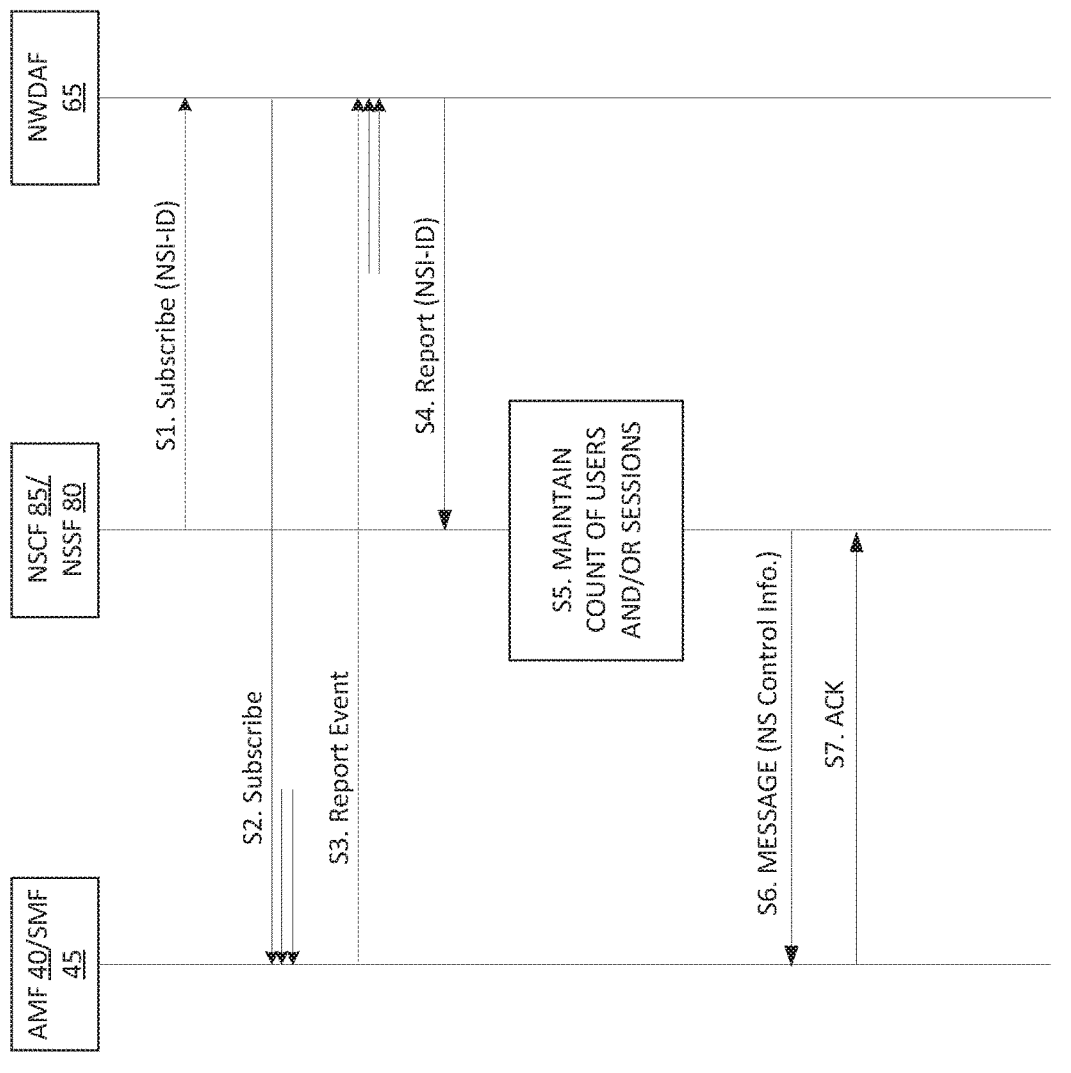
FIG. 7 illustrates an exemplary procedure for controlling network slice usage.

Instead of receiving event notifications directly from the AMF 40 and/or SMF 45, the NSCF 85 or NSSF 80 can alternatively subscribe with a NWDAF 65 to receive event notifications or event reports as shown in FIG. 7. The NSCF 85 or NSSF 80 determines the S-NSSAIs or NSI Identifiers (NSI IDs) that need to be monitored and sends a subscription request to the NWDAF 65 to receive event notifications responsive to registration events or session establishment events for AMFs 40 and/or SMFs 45 supporting a network slice (S1). The NWDAF 65 in turn sends a subscription request to each AMF 40 and/or SMF 45 supporting the network slice (S2). In response to the subscription request from the NWDAF 65, the AMFs 40 and/or SMFs 45 within the network slice send event notifications to the NWDAF 65 responsive to a registration event (in the case of an AMF 40) or a session establishment event (in the case of a SMF 45) (S3). The NWDAF 65 can, in some embodiments, notify the NSCF 85 or NSSF 80 each time an event notification is received, or alternatively, provide event reports to the NSCF 85 or NSSF 80 periodically, or based on a trigger (S4). The NSCF 85 or NSSF 80 may keep count of the number of users and/or number of PDU sessions for each network slice being monitored (S5).

When a threshold or quota is reached, the NSCF 85 may send network slice control information to the AMF 40 and/or SMF 45 accordingly (S6). The network slice control information may, for example, comprise quotas on the maximum number of users or maximum number of PDU sessions for the network slice as previously described. In other embodiments, the network slice control information may comprise an indication to start accepting new users, stop accepting new users, start accepting new PDU sessions, or stop accepting new PDU sessions. In response to the message from the NSCF 85, the AMF 40 or SMF 45 sends an acknowledgment back to the NSCF 85 and applies the network slice control information (S7).

Figure 8:
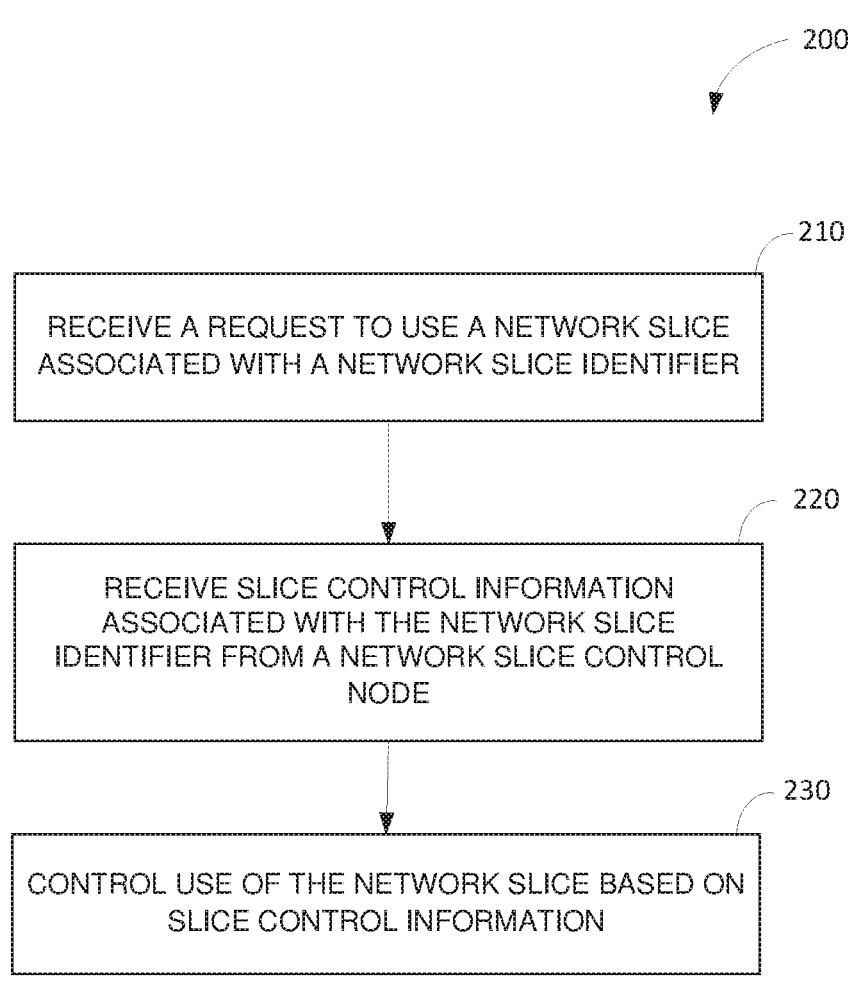
FIG. 8 illustrates an exemplary method performed by an AMF or SMF during user registration or session establishment.

FIG. 8 illustrates an exemplary method 200 implemented by a network node (e.g. AMF 40 or SMF 45) of controlling usage of a network slice. The network node receives a request to use a network slice associated with a network slice identifier (block 210). In some embodiments, the network node may comprise an AMF 40 and the request may comprise a request to register a user on the network slice. In some embodiments, the network node may comprise a SMF 40 and the request may comprise a request to establish a session for a user on the network. The network node further receives network slice control information associated with the network slice identifier from a network slice control node (e.g., NSCF 85) (block 220). The network node controls use of the network slice based on network slice control information (block 230).

In some embodiments of the method 200, receiving network slice control information comprises sending a network slice control request including the network slice identifier to the network slice control node, and receiving the network slice control information responsive to the network slice control request.

In some embodiments of the method 200, the network slice control information comprises a quota indicating a maximum number of users for the network slice or a maximum number of PDU sessions for the network slice.

In some embodiments of the method 200, the request comprises a registration request and the network slice control information comprises a UE quota indicating a maximum number of users. Controlling use of the network slice in this context comprises determining whether to accept or reject the request based at least in part on the UE quota. In one embodiment, determining whether to accept or reject the request comprises determining whether acceptance of the registration request would exceed the maximum number of users.

In some embodiments of the method 200, determining whether to accept or reject the request is further based on a priority of the user. For example, determining whether to accept or reject the request may comprise accepting the request when acceptance would exceed the maximum number of users and the user has a first priority and rejecting the request when acceptance would exceed the maximum number of users and the user has a second priority lower than the first priority. In another embodiment, determining whether to accept or reject the request comprises accepting the request of a first user with a first priority, and de-registering a user with a second priority lower than the first priority when the acceptance of the first user's request exceeds the maximum number of user for the network slice.

In some embodiments of the method 200, determining whether to accept or reject the request is further based on a location of the user. For example, determining whether to accept or reject the request may comprise accepting the request when acceptance would not exceed the maximum number of users for an area in which the user is located, and rejecting the request where acceptance would exceed the maximum number of users for the area in which the user is located.

In some embodiments of the method 200, the request comprises a session establishment request and the network slice control information comprises a PDU session quota indicating a maximum number of PDU sessions. Controlling use of the network slice in this context comprises determining whether to accept or reject the request based at least in part on the PDU session quota.

In some embodiments of the method 200, determining whether to accept or reject the request comprises determining whether acceptance of the registration request would exceed the maximum number of PDU sessions.

In some embodiments of the method 300, determining whether to accept or reject the request is further based on a location of the user. For example, determining whether to accept or reject the request may comprise accepting the request when acceptance would not exceed the maximum number of PDU sessions for an area in which the user is located, and rejecting the request where acceptance would exceed the maximum number of PDU sessions for the area in which the user is located.

In some embodiments of the method 200, determining whether to accept or reject the request is further based on a priority of the session. For example, determining whether to accept or reject the request may comprise accepting the request when accepting the request when acceptance would exceed the maximum number of PDU sessions and the session has a first priority, and rejecting the request where acceptance would exceed the maximum number of PDU sessions and the session has a second priority lower than the first priority.

In some embodiments of the method 200, determining whether to accept or reject the request is further based on a session type. For example, determining whether to accept or reject the request may comprise accepting the request when acceptance would not exceed the maximum number of PDU sessions for a requested session type, and rejecting the request where acceptance would exceed the maximum number of PDU sessions for a requested session type.

Some embodiments of the method 200 further comprise notifying the network slice control node when the quota is reached.

Some embodiments of the method 200 further comprise requesting, from the network slice control node, an allocation of an additional quota.

In some embodiments of the method 200, the network slice control information (e.g. UE quota, PDU session quota) is valid for a predetermined time period.

In some embodiments of the method 200, the network slice control information comprises an indication whether to accept or reject the request. In this case, determining whether to accept or reject the request based on network slice control information comprises accepting or rejecting the request based on the indication from the network slice control node.

In some embodiments of the method 200, the network slice control information comprises an indication to allow or reject new users for a network slice.

In some embodiments of the method 200, the network slice control information comprises a list of network slices for which new users can be accepted.

In some embodiments of the method 200, the network slice control information comprises an indication to accept or reject new PDU sessions for a network slice.

In some embodiments of the method 200, the network slice control information comprises a list of network slices for which new PDU sessions can be accepted.

Some embodiments of the method 200 further comprise accepting the registration request and registering the user for the network slice, and notifying the slice monitoring node upon registration by the user.

Figure 9:
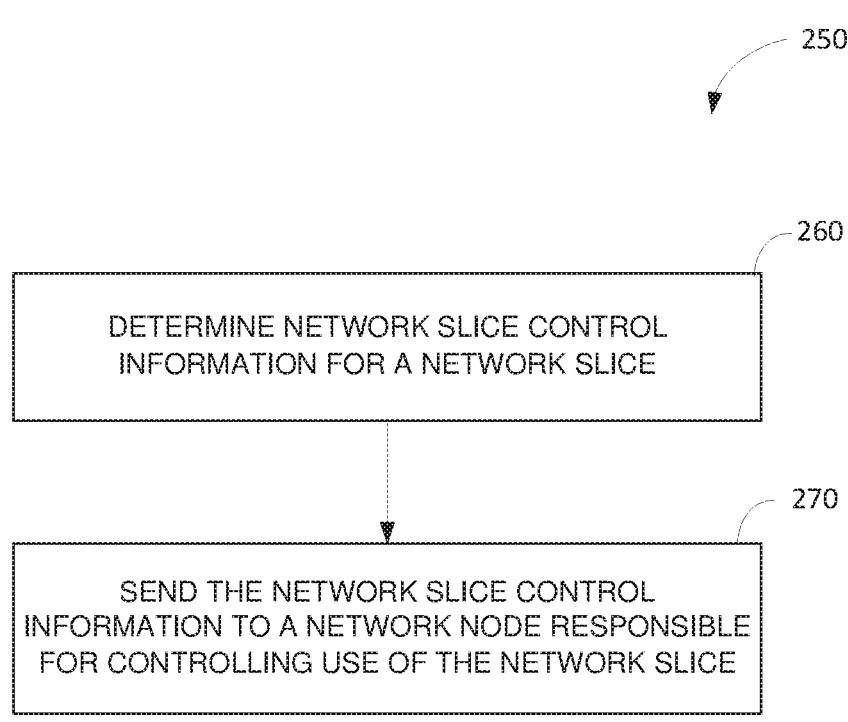
FIG. 9 illustrates an exemplary method performed by NSCF during user registration or session establishment.

FIG. 9 illustrates an exemplary method 250 implemented by a NSCF 85 of controlling usage of a network slice. The NSCF 85 determines network slice control information for a network slice (block 260). The NSCF 85 sends the network slice control information to a network node (e.g., AMF 40 or SMF 45) responsible for controlling use of the network slice (block 270).

Some embodiments of the method 250 further comprise receiving a request from the network node in the wireless communication network associated with the network slice. In this case, sending the network slice control information to the network node is responsive to the request.

In some embodiments of the method 250, the network slice control information comprises a quota indicating a maximum number of users for the network slice or a quota indicating a maximum number of PDU sessions for the network slice.

In some embodiments of the method 250, the request comprises a request to allow registration of a user on the network slice and the network slice control information comprises a UE quota indicating a maximum number of users. In some embodiments, the UE quota is a quota for an area covered by the network slice.

In some embodiments of the method 250, the network slice control information comprises an indication to accept or reject the request to register a user on the network slice.

In some embodiments of the method 250, the request comprises a request to allow establishment of a session on the network slice and network slice control information comprises a quota indicating a maximum number of PDU sessions. In some embodiments, the quota for a specified area covered by the network slice. In other embodiments, the quota for a specified session type.

In some embodiments of the method 250, the network slice control information comprises an indication to accept or reject the request to establish a session on the network slice.

Some embodiments of the method 250 further comprise receiving a notification when the quota is reached and performing a control action responsive to the notification.

Some embodiments of the method 250 further comprise granting, when the quota has been reached, an allocation of an additional quota.

In some embodiments of the method 250, the network slice control information is valid for a predetermined time period.

In some embodiments of the method 250, the network slice control information comprises an indication to allow or reject new users for a network slice.

In some embodiments of the method 250, the network slice control information comprises a list of network slices for which new users can be accepted.

In some embodiments of the method 250, the network slice control information comprises an indication to accept or reject new PDU sessions for a network slice.

In some embodiments of the method 250, the network slice control information comprises a list of network slices for which new PDU sessions can be accepted.

Some embodiments of the method 250 further comprise receiving network slice usage reports regarding the usage of the network slice and determining the network slice control information based at least on part on the reports.

In some embodiments of the method 250, the network slice usage reports are received from at least one mobility management node, at least one session control node, or both.

Some embodiments of the method 250 further comprise subscribing to receive the network slice usage reports with the at least one mobility management node, the at least one session control nodes, or both.

In some embodiments of the method 250, the network slice usage reports are received from a network data analytics function. In one embodiment, the method 250 further comprises subscribing to receive the network slice usage reports with the network data analytics function.

Figures 10, 11:
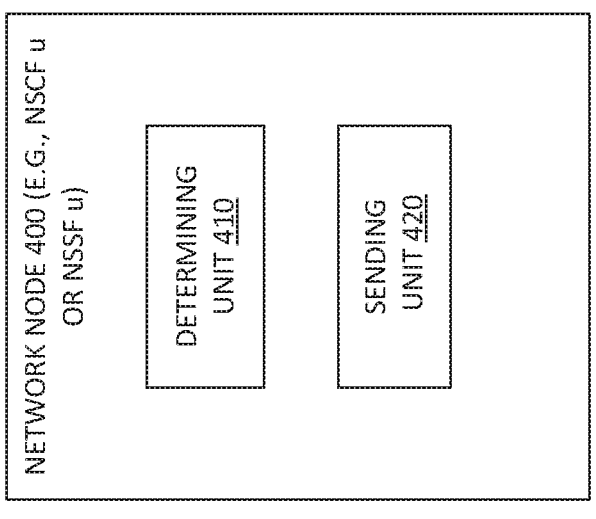
FIG. 10 illustrates an exemplary network node (e.g., AMF or SMF) configured to control usage of a network slice.
FIG. 11 illustrates an exemplary network node (e.g., NSCF) configured to control usage of a network slice.

FIG. 10 illustrates the main functional components of a network node 300 configured to control use of a network slice. The network node may, for example, serve as an AMF 40 or SMF 45. The network node 300 comprises a first receiving unit 310, a second receiving unit 320, a and a control unit 330. The various units 310-330 can be implemented by hardware and/or by software code that is executed by one or more processors or processing circuits. The first receiving unit 310 is configured to receive a request to use a network slice associated with a network slice identifier. The request may, for example, comprise a request to register a user or a request to establish a session for a user. The second receiving unit 320 is configured to receive network slice control information associated with the network slice identifier from a network slice control node (e.g. NSCF 85). The control unit 330 is configured to control use of the network slice based on network slice control information.

FIG. 11 illustrates the main functional components of another network node 400 configured to control use of a network slice. The network node 400 may, for example, serve as a NSCF 85. The network node 400 comprises a determining unit 410 and a sending unit 420. The various units 410-420 can be implemented by hardware and/or by software code that is executed by one or more processors or processing circuits. The determining unit 410 is configured to determine network slice control information for a network slice. The sending unit 420 is configured to send the network slice control information to a network node (e.g., AMF 40 or SMF 45) responsible for controlling use of the network slice.

Figure 12:
FIG. 12 illustrates an exemplary network node (e.g., AMF, SMF or NSCF) configured to control usage of a network slice.
Figure 12:
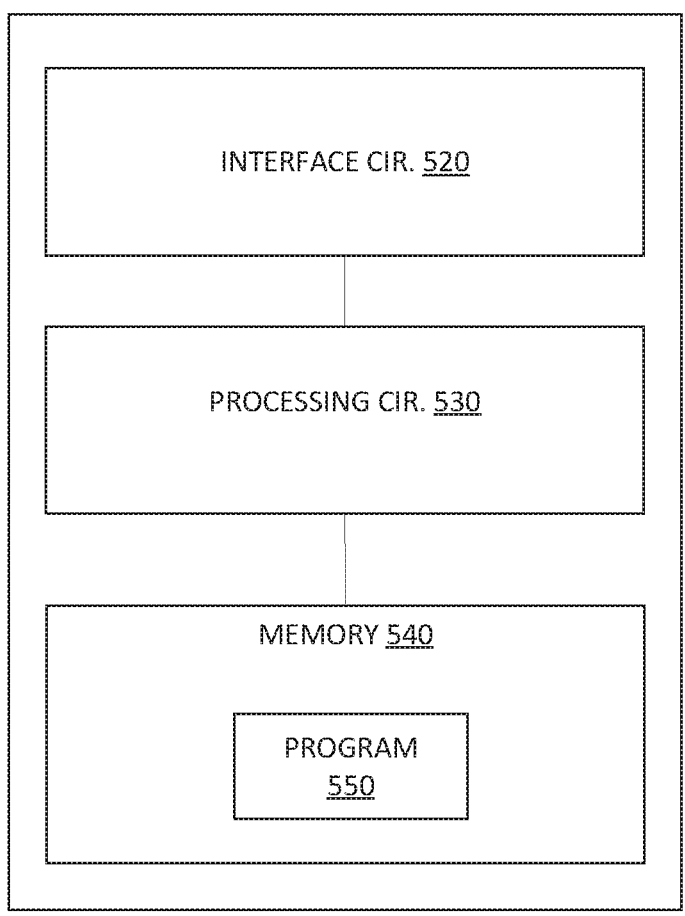

FIG. 12 illustrates a core network node 500 according to one embodiment that may be configured to function as an AMF 40, SMF 45 or NSCF 85. The core network node 500 comprises interface circuitry 520, processing circuitry 530 and memory 540. Interface circuitry 520 couples the core network node 500 to a communication network and enables communication with other core network nodes in the wireless core network. Processing circuitry 530 controls the overall operation of the core network node 500 and executes computer programs 550 stored in memory 540 to perform one or more of the methods as herein described. The processing circuitry 530 may comprise one or more microprocessors, hardware, firmware, or a combination thereof. Memory 540 comprises both volatile and non-volatile memory for storing computer program code and data needed by the processing circuitry 530 for operation. Memory 540 may comprise any tangible, non-transitory computer-readable storage medium for storing data including electronic, magnetic, optical, electromagnetic, or semiconductor data storage. Memory 540 stores a computer program 550 comprising executable instructions that configure the processing circuitry 530 to implement the method 200 (for a AMF 40 or SMF 45) or method 300 (for a NSCF 85) according to FIGS. 8 and 9 respectively as described herein. A computer program 550 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, the computer program for configuring the processing circuitry 530 as herein described may be stored in a removable memory, such as a portable compact disc, portable digital video disc, or other removable media. The computer program 550 may also be embodied in a carrier such as an electronic signal, optical signal, radio signal, or computer readable storage medium.

Those skilled in the art will also appreciate that embodiments herein further include corresponding computer programs. A computer program comprises instructions that, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

THE TECHNIQUES HEREIN DESCRIBED

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a network node in a wireless communication network, the method comprising the network node:

receiving a registration request from a user to use a network slice, the registration request including a network slice identifier for the network slice;

receiving network slice control information from a network slice control node, wherein the network slice control information comprises a binary indication for each of one or more network slices indicating either that a quota for the network slice has been reached or that the quota for the network slice has not been reached; and controlling use of the network slice based at least in part on the indication.

2. The method of claim 1, wherein the receiving network slice control information comprises:

sending a network slice control request including the network slice identifier to the network slice control node; and receiving the network slice control information for the indicated network slice responsive to the network slice control request.

3. The method of claim 1, wherein the network slice control information comprises a quota indicating a maximum number of users for the network slice, or a maximum number of PDU sessions for the network slice.

4. The method of claim 3, wherein the network slice control information comprises a quota indicating a maximum number of users.

5. The method of claim 4, wherein the controlling use of the network slice comprises determining whether to accept or reject the request based at least in part on the quota.

6. The method of claim 5, the determining whether to accept or reject the request comprises determining whether acceptance of the registration request would exceed the maximum number of users.

7. The method of claim 5, wherein the determining whether to accept or reject the request is further based on a priority of the user.

8. The method of claim 7, wherein the determining whether to accept or reject the request comprises:

accepting the request when acceptance would exceed the maximum number of users and the user has a first priority; and rejecting the request when acceptance would exceed the maximum number of users and the user has a second priority lower than the first priority.

9. The method of claim 7, wherein the determining whether to accept or reject the request comprises:

accepting the request of a first user with a first priority; and de-registering a user with a second priority lower than the first priority when the acceptance of the first user's request exceeds the maximum number of user for the network slice.

10. The method of claim 5, wherein the determining whether to accept or reject the request is further based on a location of the user.

11. The method of claim 10, wherein the determining whether to accept or reject the request comprises:

accepting the request when acceptance would not exceed the maximum number of users for an area in which the user is located;

rejecting the request where acceptance would exceed the maximum number of users for the area in which the user is located.

12. A network node in a wireless communication network, the network node comprising:

interface circuitry for communicating over a communication network with other network nodes; and processing circuitry configured to:

receive a registration request from a user to use a network slice, the registration request including a network slice identifier for the network slice;

receive network slice control information associated with the network slice identifier from a network slice control node, wherein the network slice control information comprises a binary indication for each of one or more network slices indicating either that a quota for the network slice has been reached or that the quota for the network slice has not been reached; and control use of the network slice based at least in part on the quota.

\* \* \* \* \*